Patented Nov. 14, 1922.

1,435,703

UNITED STATES PATENT OFFICE.

JOHN THAYER ELLSWORTH, OF PARK CITY, UTAH.

RECOVERY OF ZINC.

No Drawing.   Application filed December 17, 1921.   Serial No. 523,210.

*To all whom it may concern:*

Be it known that I, JOHN T. ELLSWORTH, a citizen of the United States, residing at Park City, in the county of Summit, State of Utah, have invented certain new and useful Improvements in the Recovery of Zinc; and I do hereby declare the following to be a full, clear, and exact description of the invention, such as will enable others skilled in the art to which it appertains to make and use the same.

This invention relates to the treatment of zinciferous materials, such as zinc ores, their concentrates, and the like, for the recovery of zinc therefrom by electrolysis, and has for its object the provision of certain improvements in the electrolytic method of recovering zinc from such materials.

In the treatment of zinciferous materials for recovering zinc therefrom by electrolysis, the zinc ore, zinc concentrate, or other zinciferous material, if not already in an oxidized condition, is roasted in order to convert the zinc compounds thereof into a readily soluble form, the oxidized or roasted material is treated with an appropriate solvent, such as sulfuric acid, for dissolving the zinc content thereof. The spent electrolyte or tail solution of the electrolytic cells is usually employed as the solvent and is circulated in a cyclic manner through the solution or leaching apparatus, purifying apparatus and the electrolytic cells. The zinciferous material usually contains various other metallic substances which are dissolved along with the zinc, such for example, as iron, copper, cadmium, antimony, etc. The presence of these metallic substances in the electrolyte during the electrodeposition of the zinc gives rise to certain well recognized difficulties and objections, and it is customary to subject the zinc containing solution prior to its electrolysis to various treatments for removing impurities (that is, compounds other than zinc) therefrom.

One of the most harmful impurities which may be present in a zinc sulfate solution prepared for electrolysis in respect to its effect upon the zinc deposition is the metal antimony. When present in the electrolyte to the amount of only 0.0001%, or one part per million of solution, antimony will lower the current efficiency under the usual commercial plan conditions from 5 to 10% for a forty-eight hour deposit, larger amounts of antimony having a still more serious effect.

The heretofore usual method of eliminating antimony from zinc sulfate electrolytes is to thoroughly oxidize the electrolyte before the usual neutralization for the precipitation of iron. Antimony is thereby probably precipitated as ferric antimonate or as antimony pentoxide and the finely divided precipitate carried out in the coagulated ferric hydrate. Antimony is also precipitated from solution as sulfate by metallic iron or zinc, the iron test being one of the most delicate ones for determining the presence of antimony in any solution.

I have found that while the oxidation and iron methods will remove most of the antimony present in the zinc sulfate electrolyte, they will not remove it to the necessary maximum extent for efficient action of the electrolytic zinc cell. The amount of zinc dust which is ordinarily used for the precipitation of copper and cadmium from zinc sulfate electrolytes will also precipitate some antimony which may be left in the electrolyte after the previous purifying treatments. Quite frequently the amount of antimony remaining in the electrolyte, after the aforementioned regular line of purifying treatments, amounts to from one to three parts per million of solution, which is still too large an amount for efficient cell action. Metallic iron has no effect on antimony under these conditions. In such small amounts, it is not easy to determine the exact chemical form in which the antimony may be present in the electrolyte; it may be present as antimonous or antimonic sulfate or as an antimonate.

My present invention contemplates, as an improvement in the purification of zinc electrolytes, the step of removing antimony therefrom to the extent necessary for inhibiting the deleterious effect of this impurity upon the electro-deposition of the zinc. The invention is based upon my discovery that a small amount of hydrogen sulfide gas will insure purification of antimony below the necessary one-part per million by passing such gas slowly through the zinc electrolyte after the electrolyte has been purified with zinc dust and appropriately acidified. Thus, I have found that by acidifying a zinc sulfate electrolyte, after such electrolyte has been subjected to the heretofore customary sequence of purification treatments, with tail acid from the electrolytic cells to a strength of 0.7% sulfuric acid, or more, then saturating the electrolyte with hydrogen sulfide gas for a period of from thirty minutes to two hours and allowing the so treated electrolyte to stand before filtering for a period of from three to four hours or longer the antimony will be precipitated to 0.00005%, or less, in solution, together with the small amount of zinc sulfide which is formed. The electrolyte is then filtered and the precipitate may be treated for the recovery of the zinc therein, if necessary. By acidifying the zinc sulfate solution to this amount (0.7% sulfuric acid) the quantity of zinc which is precipitated is usually insignificant.

In carrying out the improvements of the invention, the zinciferous material is leached in the usual way with spent electrolyte and the resulting solution is subjected to the heretofore customary purification steps, such as treatment with metallic zinc and the like. In accordance with the invention, the treatment of the zinc solution or electrolyte with hydrogen sulfide gas takes place just prior to the introduction of the electrolyte into the electro-depositing cells. If the hydrogen sulfide gas were used at an earlier point in the cycle the other metallic impurities which are present in the solution are thrown out as sulfides, which in the case of copper and cadmium means further expense to reduce them to the metallic form and the larger amount of finely divided sulfides makes filtration more difficult and operating costs excessive. Where the zinc solution or electrolyte is concentrated and thereby a certain amount of soluble salts, which are not removed from the cyclic solution by any definite chemical or electrochemical reaction to which the solution is normally subjected, are precipitated therefrom, and the resulting solution appropriately diluted for the electrolytic action, the treatment with hydrogen sulfide gas for the removal of antimony may precede or follow the concentrating step. The removal of such soluble salts from the electrolyte by concentration and subsequent dilution is described and claimed in my pending patent application, Serial No. 484,195, filed July 12, 1921.

It will thus be seen that the present invention in its preferred form involves the removal of antimony from the zinc solution or electrolyte by saturating the solution with hydrogen sulfide gas after the removal from the solution of other metallic impurities such as iron, copper, cadmium, etc. The zinc solution is allowed to stand an appropriate length of time after treatment with the hydrogen sulfide gas in order to complete the removal and precipitation to the desired extent of the antimony in the solution, and the resulting precipitate is then separated from the solution by filtration or in any other appropriate manner.

The advantages resulting from the removal of antimony from the zinc solution by means of hydrogen sulfide gas in accordance with the principle of the present invention may be enumerated as follows:—

(1) the excessive addition of iron or salts of iron and of oxidizing agents at previous points in the cycle are rendered unnecessary;

(2) the hydrogen sulfide gas serves as a final purifier for small amounts of other metals such as copper which may have passed the regular purification treatment;

(3) if the acid strength is kept at 0.7%, or only slightly above, cadmium sulfide will also be precipitated and the excess amount of zinc dust which is usually necessary for the sufficient precipitation of this metal in the metallic state may be avoided;

(4) on account of the extremely small amounts of metals present in the zinc solution other than zinc, the amount of hydrogen sulfide gas consumed is small and the cost of this treatment step is not excessive;

(5) hydrogen sulfide gas used in this manner also has a clarifying action on the zinc sulfate solution carrying down finely divided suspended solids which may be present on account of previous faulty filtration or as supersaturated salts.

I claim:—

1. In the method of recovering zinc from zinciferous materials involving the treatment of the zinciferous material with a solvent solution and electro-deposition of zinc therefrom, the step of reducing the antimony content of the solution, subsequent to a preliminary purification thereof, in the course of which purification antimony is partially removed from the solution together with other impurities, which comprises treating the solution with hydrogen sulfide gas and separating the resulting precipitate from the solution whereby the antimony content of the solution is reduced to the extent necessary for inhibiting the deleterious effect of this impurity upon the electro-deposition of the zinc.

2. In the method of recovering zinc from zinciferous materials involving the treatment of the zinciferous material with a solvent solution and electrodeposition of zinc therefrom, the step of reducing the antimony content of the solution, subsequent to a preliminary purification in the course of which purification antimony is partially removed from the solution together with other impurities, which comprises treating the solution, acidified to a strength of about 0.7% sulfuric acid, with hydrogen sulfide gas and separating the resulting precipitate from the solution whereby the antimony content of the solution is reduced to the extent necessary for inhibiting the deleterious effect of this impurity upon the electrodeposition of the zinc.

3. In the method of recovering zinc from zinciferous materials involving the treatment of the zinciferous material with a solvent solution and electrodeposition of zinc therefrom, the step of reducing the antimony content of the solution to less than 0.0001% which comprises subjecting the solution to treatment with hydrogen sulfide gas after the usual purification of the solution with zinc dust or the like, and separating the resulting precipitate from the solution.

4. In the method of recovering zinc from zinciferous materials involving the treatment of the zinciferous material with a solvent solution and electrodeposition of zinc therefrom, the steps of removing antimony from the solution prior to the electrolysis thereof and after the usual purification of the solution with zinc dust or the like which comprises treating the solution with hydrogen sulfide gas and thereby precipitating antimony together with some zinc, separating the resulting precipitate from the solution, subjecting the solution to electro-deposition, and treating said precipitate for the recovery of zinc therefrom.

5. In the method of recovering zinc from zinciferous materials involving the treatment of the zinciferous material with a solvent solution and electro-deposition of zinc therefrom, the steps of reducing the antimony content of the solution to less than 0.0001% which comprises acidifying the solution to a strength of about 0.7% sulfuric acid after the usual purification of the solution with zinc dust or the like, treating the acidified solution with hydrogen sulfide gas and thereby precipitating antimony together with some zinc, separating the resulting precipitate from the solution, and recovering zinc from said precipitate.

In testimony whereof I affix my signature.

JOHN THAYER ELLSWORTH.